F. E. HAND.
ADJUSTING MECHANISM FOR PLOWS.
APPLICATION FILED JULY 5, 1916.
1,217,864.
Patented Feb. 27, 1917.
2 SHEETS—SHEET 1.
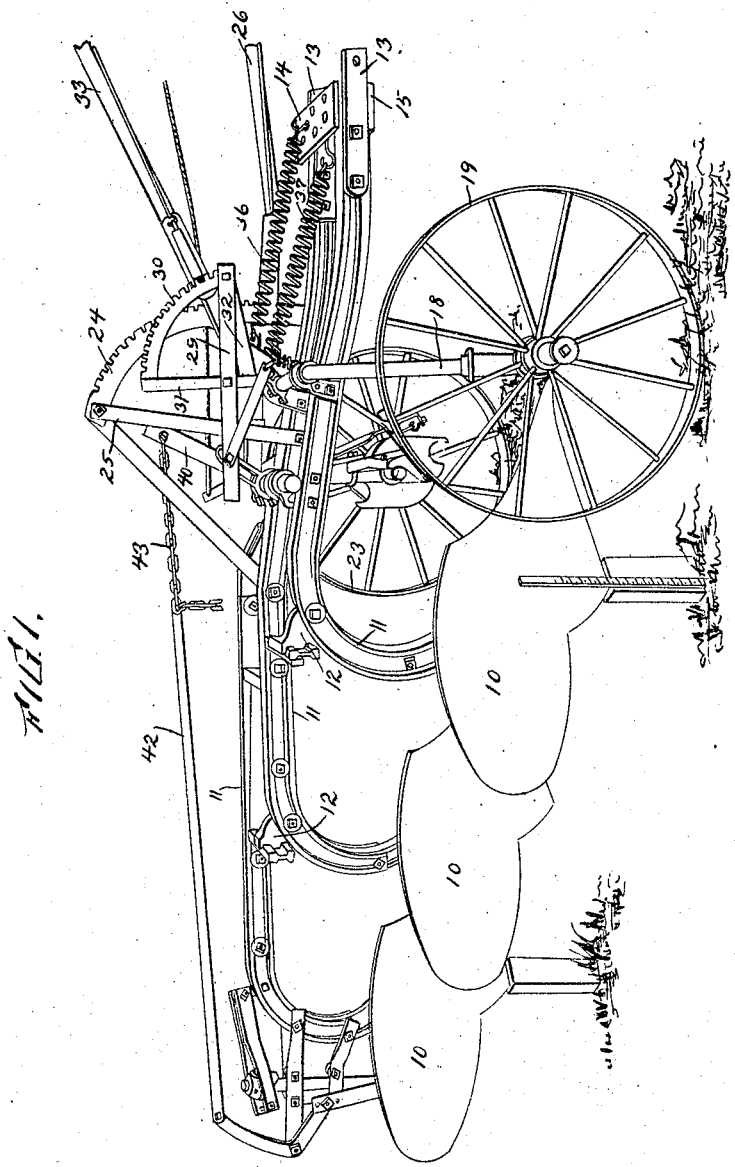
Inventor
F. E. Hand

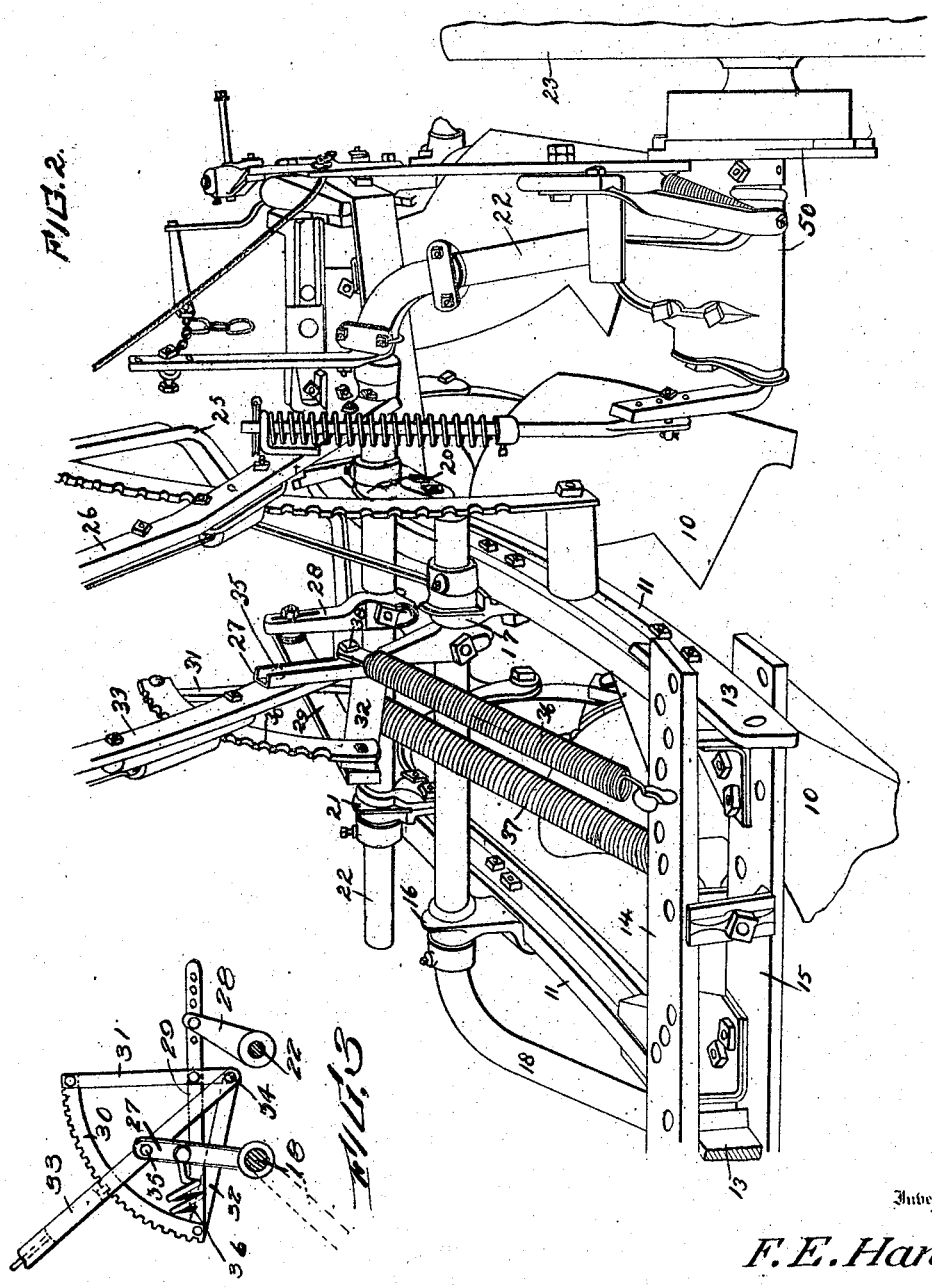

UNITED STATES PATENT OFFICE.

FREDERICK E. HAND, OF EVANSVILLE, INDIANA, ASSIGNOR TO THE VULCAN PLOW COMPANY, OF EVANSVILLE, INDIANA, A CORPORATION OF INDIANA.

ADJUSTING MECHANISM FOR PLOWS.

1,217,864.  Specification of Letters Patent.  Patented Feb. 27, 1917.

Original application filed November 17, 1915, Serial No. 62,021. Divided and this application filed July 5, 1916. Serial No. 107,658.

*To all whom it may concern:*

Be it known that I, FREDERICK E. HAND, a citizen of the United States, residing at Evansville, in the county of Vanderburg and State of Indiana, have invented certain new and useful Improvements in Adjusting Mechanism for Plows; and I do hereby declare the following to be a full, clear, and exact description of the invention, such as will enable others skilled in the art to which it appertains to make and use the same.

This invention relates to adjusting mechanism for plows and has for an object the provision of improved means for regulating the depth of the furrow without interfering with the means for raising the plow from the furrow.

With the foregoing and other objects in view, the invention consists in certain novel features of construction, combination and arrangement of parts as will be more fully described in claims.

In the accompanying drawings,

Figure 1 is a perspective view of the plow from the furrow side.

Fig. 2 is a perspective view on enlarged scale from the front showing the operating mechanism in more detail.

Fig. 3 is a detail of certain structure shown at the left of Fig. 2.

This application constitutes a division of my application filed November 17, 1915, Serial No. 62,021.

Before referring to the adjusting mechanism proper it may be stated that the plow bottoms are indicated by 10 and these are carried upon beams 11, any desired number being employed. The beams 11 are secured together adjustably by the braces 12 and are provided at their forward ends with ears 13 for attaching draft such as a tractor. A connecting structure composed of plates 14 and 15 is provided with a plurality of openings in order that the beams may be differently spaced to turn furrows of different widths.

Attached to beams 11 are bearings 16 and 17 in which a bent axle 18 is journaled, this axle carrying the furrow wheel 19, and other bearings 20 and 21 journal a bent axle 22 carrying a land wheel 23.

Rigidly secured to the frame composed of beams 11 and their braces is a segment 24 supported by braces 25. This segment is concentrically mounted relative to that portion of axle 22 mounted in bearings 20 and 21 and a lever 26 is pivoted on axle 22 and engages segment 24 in the usual manner so that when lever 26 is manipulated, the axle 22 is moved in its bearings to raise and lower the land wheel relative to the frame, or raise and lower the frame relative to the land wheel.

The furrow wheel 19 is also arranged to be raised and lowered relative to the frame simultaneously with the raising and lowering of the land wheel, such connection being by means of arm 27 rigidly connected with axle 18 and operating by a variable link connection with arm 28 rigidly mounted upon axle 22. This variable connection between the arms 27 and 28 includes a bar 29 pivotally connected to the arm 28 and carrying a segment 30 rigidly secured to bar 29 by means of braces 31 and 32. A lever 33 is pivoted to the brace 32 at 34 and is also pivoted to the arm 27 at 35. It is obvious that by manipulating lever 33, the relation of arms 27 and 28 to each other will be changed, so that when arm 28 is actuated by the movement of arm 26, arm 27 will also be actuated, but its position relative to the arm 28 may be changed manually, as described. As arm 27 controls the position of the furrow wheel, it is clear that by setting lever 33 the relation between the axles, and therefore between the furrow wheel and land wheel, will be changed and that the operation of raising plows out of the ground will not disturb such adjustment, that is, they may be raised without necessitating readjustment when again lowered to plowing position.

For the purpose of assisting in raising the plows, springs 36 and 37 are employed, the spring 36 being pivotally connected to arm 27 at 38 and the spring 37 being connected with arm 28 by link 29. These springs are connected at their front ends with draft plates 14 and 15.

The arm 40 secured to axle 22 is connected by a chain 43 with rod 42 and thence with the caster mechanism described in the copending application above referred to, wherein a power hoist 50 and means for controlling the latter are described in detail and claimed.

An important feature of the present construction is that the arm 33 remains practically stationary when the axles are shifted by other mechanism, as for instance the power hoist referred to.

It will also be observed that since axle 22 and axle 18 are connected by means of the adjustable link construction, any adjustment of arm 26 will produce a corresponding movement of axle 18, and hence arm 26 will serve to secure all depth adjustments, while arm 33 serves only to level the plows crosswise by changing the relative position of the axles and that of the wheels.

What I claim is:

1. The combination with a plow frame, of a plurality of bent axles mounted thereon, arms secured to the axles, a segment, segment supporting means connected with one of the arms, and a hand lever engaging the segment and pivoted to said means and fulcrumed on the other of said arms.

2. In a plow, the combination with a frame, of a plurality of bent axles mounted thereon, an arm extending from each axle, a segment, a lever engaging the segment and pivoted on one of the arms, and means connecting said lever with the other arm, said means including a device for supporting said segment, and a bar connected therewith.

3. The combination with a plow frame, of a plurality of bent axles mounted thereon and arms extending from the axles, a substantially arc shaped segment, a plurality of braces connected at the approximate center from which the arc is struck and connected with the ends of the segment, a lever engaging the segment and fulcrumed on one arm, and means for connecting the braces with the other arm.

4. The combination with a plow frame, of a plurality of bent axles mounted thereon, and arms extending from said axles, of a segment, and means for directly supporting the segment, a bar connecting the supporting means with one of the arms, and a lever engaging the segment and pivoted to the other arm and to the supporting means at substantially the center from which the arc of the segment is struck.

5. In a plow, a frame, a set of crank shafts on said frame with parallel portions, each having crank arms, a lever pivoted on one arm, and a segment having pivotal connection with said lever and the other arm.

6. In a plow, a frame, a set of parallel crank shafts on said frame, each having an arm, a link structure pivotally connected to one arm, and a lever pivoted upon the other arm and to said structure and operative relative thereto to vary the angle between said arms, and having locking engagement with said link structure.

7. In a plow, a frame and a pair of parallel crank shafts thereon, each having an arm, and linkage adjustably connecting said arms comprising a member pivotally connected to one arm and a locking lever adjustably connected at one end to said member and pivoted intermediate its length upon the other arm.

In testimony whereof I affix my signature.

FREDERICK E. HAND.

Copies of this patent may be obtained for five cents each, by addressing the "Commissioner of Patents, Washington, D. C."